F. E. DOBBINS.
MEAT SAW.
APPLICATION FILED JULY 7, 1917. RENEWED FEB. 12, 1919.
1,304,859.
Patented May 27, 1919.
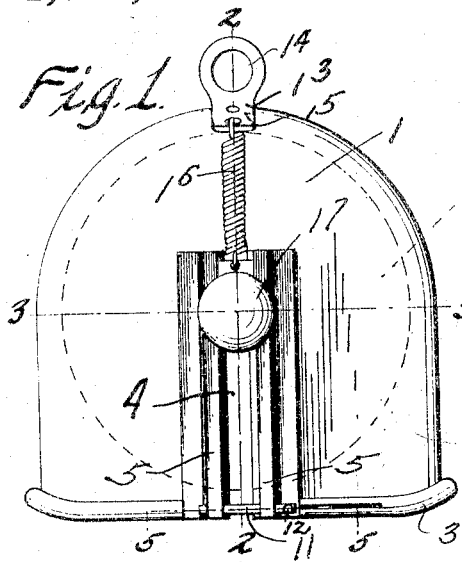
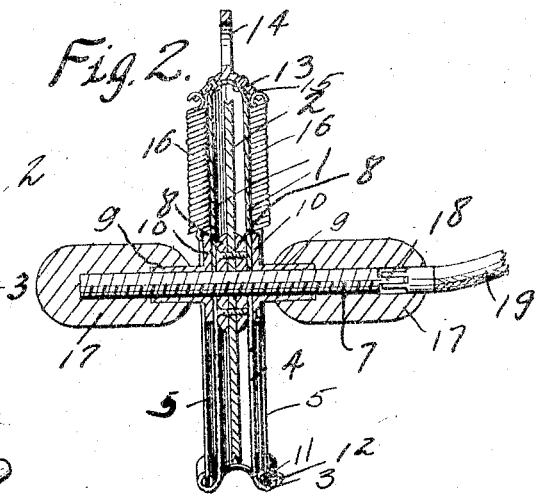
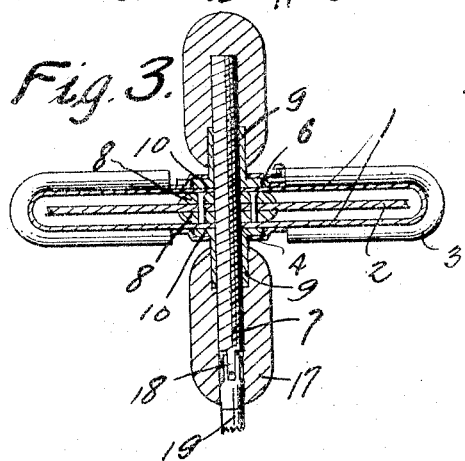
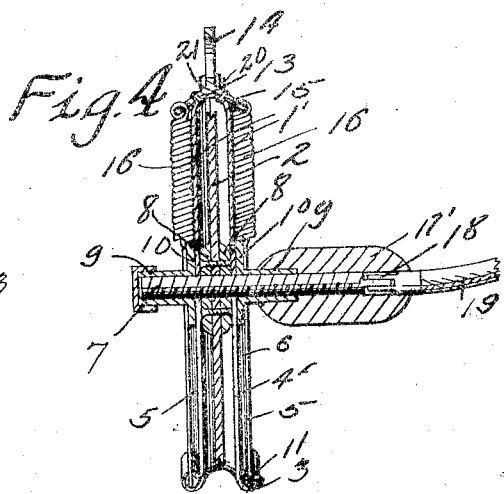
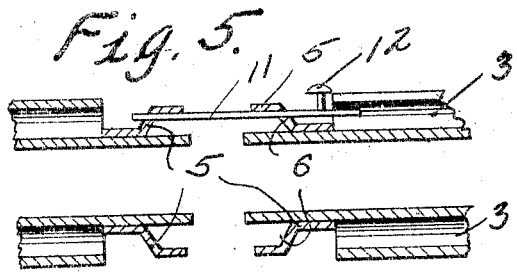
Inventor
F. E. Dobbins
Attorneys

UNITED STATES PATENT OFFICE.

FLOYD E. DOBBINS, OF STONE, KENTUCKY.

MEAT-SAW.

1,304,859.   Specification of Letters Patent.   Patented May 27, 1919.

Application filed July 7, 1917, Serial No. 179,385. Renewed February 12, 1919. Serial No. 276,600.

*To all whom it may concern:*

Be it known that I, FLOYD E. DOBBINS, a citizen of the United States, residing at Stone, in the county of Pike, State of Kentucky, have invented certain new and useful Improvements in Meat-Saws; and I do hereby declare the following to be a full, clear, and exact description of the invention, such as will enable others skilled in the art to which it appertains to make and use the same.

This invention relates to meat cutters, and has particular reference to a power driven meat saw.

The object of the invention is to provide an improved form of portable or hand carried meat saw, which will be of particular value in meat shops, hotels, or packing houses. In carrying out the invention, I mount a circular saw within a casing, and drive the saw from a flexible shaft, there being a connection between the casing and the saw bearings, whereby the latter may be moved downwardly in the casing in order to place the cutting edge of the saw to the meat to be cut.

With the above general object in view, and such others relating to the details of construction, as may hereinafter appear, my invention will now be fully set forth and described, reference being had to the accompanying drawings.

In the drawings:—

Figure 1 is a side elevation,

Fig. 2 is a section on line 2—2 of Fig. 1,

Fig. 3 is a section on line 3—3 of Fig. 1,

Fig. 4 is a sectional view of a modified form, and

Fig. 5 is a section on line 5—5 of Fig. 1.

Referring more particularly to the drawings, 1 represents a casing which is a sheet metal structure having two walls in close proximity and of comparatively wide extent, the joined walls forming a housing for completely inclosing a circular saw 2, whose contour the casing generally follows. The lower end of the casing 1 is open, so that the saw 2 may be projected therefrom, and the lower end is furthermore provided with a foot 3 formed by rolling outwardly the metal of the casing. On a line with the vertical diameter of the saw 2, the casing 1 is provided with the vertical slots 4, and outside of the casing, the walls thereof are provided with the opposing guide plates 5 which lie upon opposite sides of the slots 4 and provide the undercut slideways 6 for operation with the slots 4 in directing the movement of the saw.

The saw 2 is mounted upon a shaft 7, which projects through the bearing castings 8 which are secured to the sides of the saw, and also through bosses 9. Said bosses 9 are provided with the squared flanges 10 which operate in the slideways 6. Thus, while securely mounted in the casing 1, the saw 2 is permitted a relative vertical movement therein which is permitted by the slots 4. In order to prevent the accidental removal of the saw from the casing 1, I mount in the foot 3 slide bolt 11 which may be carried across the lower ends of one of the slots 4, the heads 12 providing for the ready manipulation of the bolts.

Secured to the top of the casing is a saddle 13 which has an upwardly extending supporting eyelet 14, and laterally extending ears 15 which provide connections for the upper ends of coil springs 16. The lower ends of these coil springs 16 are connected to the flanges 10, so that, under normal conditions the saw 2 is resiliently retained within the casing 1.

Inclosing the ends of the shaft 7 and telescopingly receiving and secured to the bosses 9, are the hand grips 17, by means of which the saw is manipulated, and extending partially through one of the hand grips 17 is a coupling 18 by means of which the shaft 7 may be connected to a flexible or other drive shaft 19. The shaft 19 will be driven by an electric motor or other suitable driving means.

In a modified form shown in Fig. 4, I have separated the casing into a pair of complementary sections 1', and have connected them by means of bolts 20 passed through lugs 21 which project at regular or suitable intervals from the edges of the sections 1'. Also, I have eliminated one of the handles 17, and have foreshortened and capped the shaft on that side, so that the saw is manipulated only by a handle 17' which extends from that side to which the drive shaft is connected. This form of the saw is sometimes preferable to the two-handled form.

From the foregoing description, it will be apparent that I have constructed a convenient and serviceable form of meat cutting saw which will be of particular service in meat shops, packing houses, hotels, and other places where it is necessary to cut up meat in quantities in comparatively short periods of time.

While I have embodied in the present disclosure forms which are at present preferred, it is to be understood that I do not limit myself to such details of construction as are disclosed, but reserve the right to make such modifications as may be hereafter deemed advisable within the scope of the appended claim.

What I claim as my invention is:—

A meat saw comprising a saddle having downwardly divergent perforated ears and having also an upwardly directed suspending eye, spaced alined bearing members, a helical suspending spring connecting each bearing member with the corresponding perforated ear, a saw shaft journaled in said bearing members, a saw fixed to the shaft between the bearing members and guiding means for the bearing members over which the saddle is fixed and in which guiding means the shaft is movable toward and from the saddle.

In testimony whereof, I affix my signature in the presence of two witnesses.

FLOYD E. DOBBINS.

Witnesses:
H. S. PERCIVAL,
C. I. CULBERTSON.